Nov. 3, 1942.  T. D. BARNES  2,300,482
MEASURING INSTRUMENTS
Filed July 13, 1939
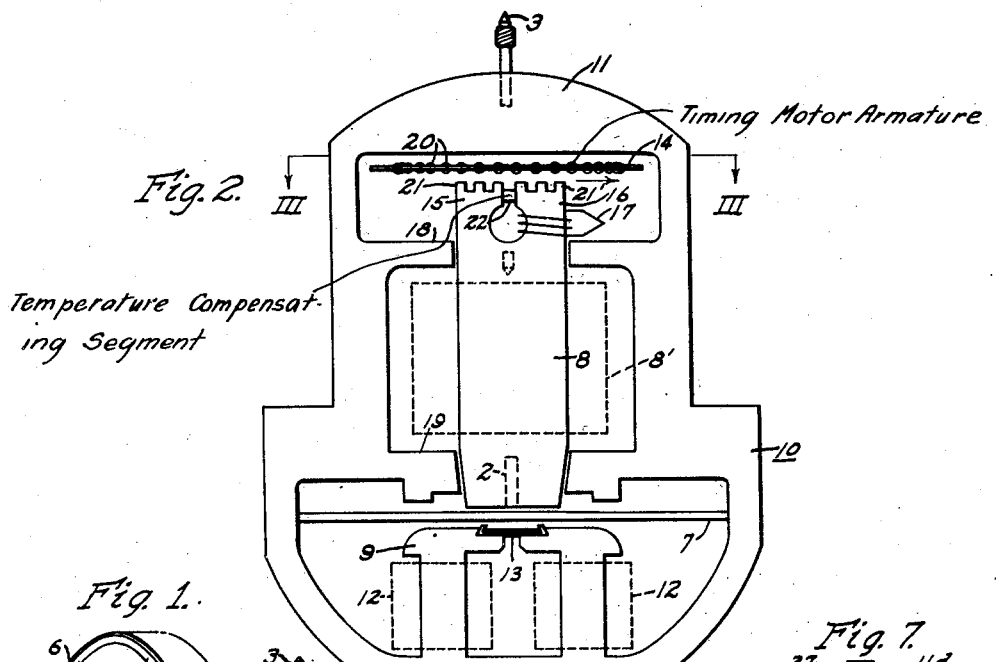
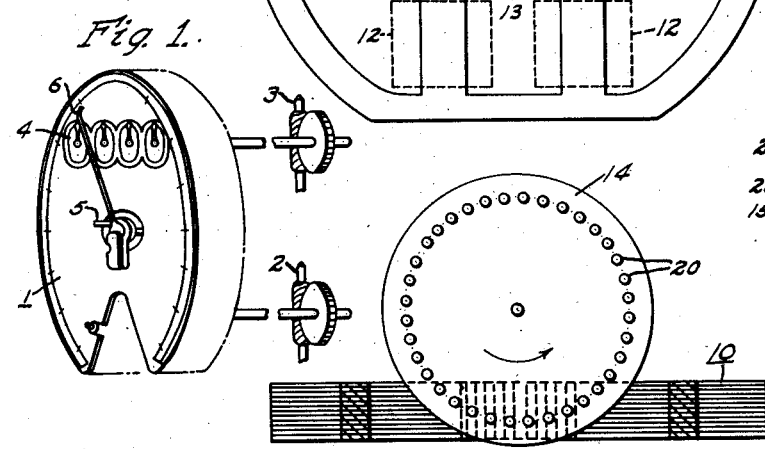
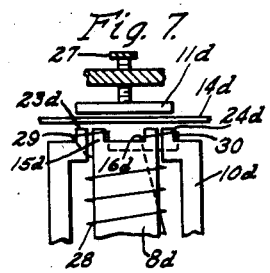
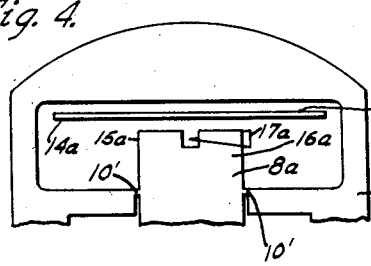
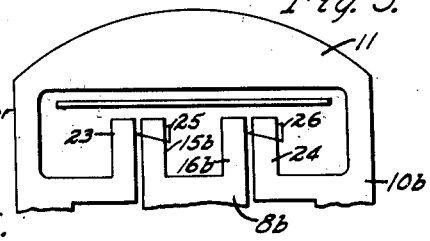
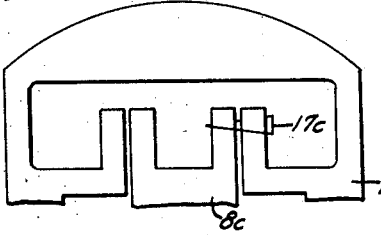
WITNESSES:
INVENTOR
Thomas D. Barnes.
BY
ATTORNEY Patented Nov. 3, 1942

2,300,482

UNITED STATES PATENT OFFICE 2,300,482

MEASURING INSTRUMENT

Thomas Dana Barnes, West Orange, N. J., assignor to Westinghouse Electric & Manufacturing Company, East Pittsburgh, Pa., a corporation of Pennsylvania Application July 13, 1939, Serial No. 284,169

7 Claims. (Cl. 171—34)

This invention relates to measuring instruments and it has particular relation to measuring instruments of the maximum demand type wherein a timing motor is employed for establishing maximum demand intervals.

Maximum demand instruments of a type commonly encountered employ two electrical motors for measuring purposes. One of these motors is a meter motor which is energized in accordance with the electrical quantity to be measured and which generally actuates mechanism for providing a continuous record of the total energy or other quantity measured. A second motor is provided for timing purposes.

The maximum demand instrument is employed in part for indicating in some suitable manner the maximum demand of electrical energy, or any other quantity, occuring in a demand interval during a billing period. Each billing period for this purpose is divided into a plurality of equal demand intervals by means of a constant speed timing motor. Maximum demand instruments may be employed for measuring various quantities such as watts, vars and volt-amperes. As generally employed, the maximum demand instrument may actuate a register for continuously integrating the energy consumption of an electrical load, or it may be employed for actuating a pen to leave a graphical record of the energy consumed. The maximum demand itself may be indicated by an indicating pointer, by a cumulative register or by a graphical record. Typical maximum demand register mechanisms are shown in the Lewis et al. Patent No. 2,047,376 and the Smith Patent No. 2,003,016, both assigned to the Westinghouse Electric & Manufacturing Company. The Lewis patent discloses a maximum demand register of the block-interval type whereas the Smith patent shows a maximum demand instrument of the logarithmic type.

In maximum demand instruments of the type set forth in the preceding paragraph, it is customary to employ two entirely separate motor mechanisms. This practice is objectionable because of the large number of parts required, the excessive number of manufacturing operations, the increased problems of servicing and maintenance, and the additional space requirements. To my knowledge, no practical method or apparatus has been suggested in the prior art for combining these motors into a single compact structure.

According to my invention, a timing motor and a measuring motor for a maximum demand instrument are combined in a single structure. The measuring motor most commonly encountered in instruments of this type employs a voltage winding which is energized in accordance with the voltage of an electrical circuit supplying a load to be measured and one or more current windings energized in accordance with the current supplied to the load. Since the voltage supplied to the voltage winding is generally substantially constant, I prefer to employ this winding for energizing a timing motor. Ordinarily, the energizing current for the current windings varies in accordance with the load demands and is less suitable for actuating a constant speed timing motor.

In a specific embodiment of my invention, a voltage winding for a measuring instrument is mounted on a magnetic core, one end of which is a pole adjacent the armature of the measuring instrument and another end of which is a pole adjacent the armature of a constant speed motor. This voltage winding supplies a portion of the energy required to actuate the armature of the measuring instrument and substantially all of the energy required to operate the armature of the timing motor. In order to supply self-starting characteristics to the constant speed timing motor, the portion of the magnetic core adjacent its armature is divided into two portions, one of which is shaded by a shading coil in order to produce a shifting field for actuating the timing motor armature. This construction lends itself readily to compensating means for compensating the timer motor for performance variations caused by temperature changes.

It is, therefore, an object of my invention to provide a maximum demand instrument of simplified construction.

It is another object of my invention to provide a maximum demand measuring instrument having a measuring motor and a timing motor energized from a common magnetic structure.

It is a further object of my invention to employ the voltage winding of a measuring instrument for energizing a timing motor.

It is another object of my invention to compensate a timing motor for variations in performance caused by temperature changes therein.

Other objects of my invention will be apparent from the following description taken in conjunction with the accompanying drawing, in which Figure 1 is a view in perspective of a maximum demand register;

Fig. 2 is a view in front elevation of a maximum demand instrument designed in accordance with my invention;

Fig. 3 is a view in section taken along the line III—III of Fig. 2; and

Figs. 4 to 7 are views showing modifications of the structure illustrated in Fig. 1.

Referring to the drawing, Fig. 1 shows a register 1 employed for many maximum demand measuring instruments. This register 1 is designed to be operated from a shaft 2 which is rotated at varying rates in accordance with a variable quantity to be measured. A timing control for the register 1 is provided by a timing shaft 3 which is rotated at a constant speed by a suitable timing motor. The register proper includes a plurality of dials 4 which constitute an integrating device directly actuated from the rotating shaft 2 to indicate at all times the total consumption of energy or other quantity to be measured. In order to indicate the maximum demand for a predetermined interval, a pusher element 5 is coupled to the shaft 2 through a suitable clutch, not shown. At the end of each demand interval, a common interval being of 30 minutes duration, the clutch is released to permit the pusher element 5 to return to its initial or zero position. Consequently, during each demand interval, the pusher element 5 is actuated to a position corresponding to the load demand for that interval, and during its actuation it engages a maximum demand indicator 6 and pushes it to a position corresponding to the advance of the pusher element. When the pusher element 5 returns to its initial position, the maximum demand indicator 6 is held in its advanced position by means of friction. Should the pusher element 5 be advanced a greater extent during a successive interval, it re-engages the maximum demand pointer 6 and advances it further over its scale. Consequently, at the end of a billing period, the maximum demand pointer indicates the maximum demand for a demand interval occurring during the billing period. A more detailed description of this register will be found in the aforesaid Lewis patent.

In order to actuate the register 1, I provide a measuring instrument armature 7 (Fig. 2) which is rotated in accordance with the quantity to be measured and which may be mounted on the shaft 2. This armature 7 may be an electro-conductive disc, such as an aluminum or copper disc, which is placed in the air gap formed by a potential pole 8 and current poles 9 of an electromagnet 10. When employed as a wattmeter, a potential winding 8', shown in dotted lines, is mounted on the potential pole 8 and is connected to be energized in accordance with the potential of an alternating current electrical circuit supplying a load to be measured. Current windings 12, shown in dotted lines, are provided on the current poles 9 and are energized in accordance with the current supplied to the load. As is well understood in the art, the windings 8' and 12 coact to produce in the gap between the poles a shifting field which rotates the armature 7 in accordance with the energy supplied to the load. Ordinarily, a saturating shunt 13 is provided for shunting flux between the current poles 9 in order to compensate the meter for errors caused by the damping action of flux passing through the armature 7. It will be understood that a permanent damping magnet (not shown) is employed for damping the rotation of the armature 7 in order that its rotation may be a measure of the energy supplied to the load. The portion of the instrument shown in Fig. 2 which has thus far been described is well known in the art and further description of its operation, therefore, is believed unnecessary.

A constant speed motor for actuating the register 1 is built into the same electromagnet 10 which is employed for actuating the armature 7. To this end, an electro-conductive disc 14 may be mounted above the potential pole 8 on the shaft 3 which is connected to the register 1. In order to effect rotation of the armature 14, the potential pole at its upper end is divided into two (or more) portions, such as portions 15 and 16, for supplying magnetic flux produced by the winding 8' to the armature 14. One of the portions 16 is provided with a closed electrical winding or shading coil 17. As is well understood in the art, this shading coil operates to retard or lag flux passing through the portion 16 of the potential core behind the magnetic flux passing through the portion 15. Consequently, a shifting magnetic field is set up in the air gap adjacent the armature 14 and produces rotation of the armature in a manner well understood in the art. Like the armature 7, the armature 14 may comprise a disc of electro-conductive material, such as copper or aluminum.

In order to improve the magnetic path of flux traversing the armature 14, I prefer to provide the electro-magnet 10 with a cross piece 11 extending across the armature 14 between the side pieces of the electro-magnet 10. Since the energization of the potential winding 8' is substantially constant, it follows that the rotation of the armature 14 is substantially constant and may be employed for timing purposes.

The core of the electro-magnet 10 itself generally is made up of a plurality of laminations of soft iron and is provided with extensions 18 and 19 designed to provide suitable inductance for the winding 8' and constancy of performance.

It is believed that the operation of the structure thus far described is apparent. When the voltage winding 8' and current winding 12 are energized, a shifting magnetic flux is produced between the potential pole 8 and the current poles 9 which operate to rotate the armature 7 in accordance with energy supplied to a load. Through the shaft 2, the armature 7 actuates the register 1 to indicate on the dials 4 the total energy consumption of the load, and actuates the pusher element 5 for providing an indication of the maximum demand.

At the same time, the voltage winding 8' forces magnetic flux through the potential pole 8 across the armature 14 and rotates the shaft 3 at a substantially constant rate. Consequently, at the end of each demand interval, the armature 14 operates through the shaft 3 to disengage the pusher element 5 from the shaft 2 whereby the pusher element 5 returns to its initial position.

Although the structure thus far described is fully operative, it may be desirable to have synchronous operation of the armature 14. To this end, the armature 14 may be provided with a plurality of uniformly spaced iron or steel bodies 20. Hardened steel balls may be employed for this purpose, but it is to be understood that soft iron bodies also are useful. Further improvement may be effected by forming each of the portions 15 and 16 with a plurality of salient poles 21 and 21'.

It will be understood that when the winding 8' is energized, the shifting magnetic field set up by the portions 15 and 16 through the salient poles 21, 21' operates by induction action to start the armature 14 rotating. When the armature 14 is near its predetermined synchronous speed, the steel balls 20 cooperate with the salient poles 21 to lock the armature 14 in synchronism.

Since the magnetic flux passing through the pole portion 16 lags the flux passing through the portion 15, it may be desirable to advance the salient poles 21' on the portion 16 physically with reference to the salient poles on the portion 15 in order that synchronizing impulses developed by each set of salient poles may occur when the adjacent steel balls are in the same relative position with respect to the nearest salient poles. For example, when steel balls are directly over the salient poles 21 on the portion 15, the salient poles 21' on the portion 16 are slightly ahead of the nearest steel balls in the direction of rotation of the armature 14.

Most materials have electrical characteristics which vary in accordance with variations in temperature. For example, the resistance of the winding 8' and the resistance of the armature 14 increase with an increase in temperature. This increase in resistance normally would result in a slight reduction in the torque supplied to the shaft 3. In order to maintain this torque substantially constant regardless of temperature variations, a magnetic segment 22 may be placed between the two portions 15 and 16 of the potential pole. This magnetic segment is of material so constructed that it has a negative temperature coefficient of permeability. Consequently, as the temperature of the measuring instrument rises, the permeability of the segment 22 decreases to increase the reluctance of the local magnetic circuit for the shading winding 17. As a result, the magnetic flux passing through the shading winding 17 becomes more effective as the temperature rises and compensates for the decrease in torque that otherwise would result from the increase in resistance of the various windings and armature 14. By suitably proportioning the magnetic segment 22, the torque developed by the armature 14 may be maintained substantially constant regardless of temperature variations. Various materials are suitable for the segment 22. A typical magnetic alloy comprising about 68% nickel, 30% copper and 2% iron has the desired magnetic properties.

A number of modifications of the construction of the portions 15, 16 have been illustrated. In Fig. 4 an electromagnet 10a is illustrated which is substantially the same as the electromagnet 10 of Fig. 2. This electromagnet is provided with a potential pole 8a divided into two portions 15a and 16a having substantially flat surfaces. A plain armature disc 14a is shown in Fig. 4, but this may be modified if desired. Instead of the electro-conductive aluminum or copper disc illustrated in Fig. 2, the disc 14a may be a hardened steel disc which operates as a hysteresis motor armature.

It will be noted that in Fig. 2 the potential pole 8 is illustrated as a completely separate part of the electromagnet 10. The potential pole may be separated from the remainder of the electromagnet 10 by air gaps or by non-magnetic spacers. However, if desired, the potential pole may be connected to the electromagnet 10 by one or more sections of reduced cross section which saturate during normal operation of the electromagnet. This has been illustrated in Fig. 4 wherein the potential pole 8a is connected to the electromagnet 10a by means of sections 10' of reduced cross section. A shading coil 17a corresponds to that illustrated in Fig. 2. This shading coil may be a multi-turn coil, one or more single turn coils punched from a sheet of electro-conductive material, such as copper, or it may be formed by other known methods.

In Fig. 5, an electromagnet 10b is illustrated which is substantially similar to that illustrated in Fig. 2, except for the provision of extensions 23 and 24 adjacent its potential pole 8b. This potential pole is provided with portions 15b and 16b adjacent the extensions 23 and 24. Shading coils 25 and 26 are illustrated on the portion 15b and the extension 24.

Fig. 6 is substantially the same as Fig. 5, the elements 8c and 10c corresponding to the elements 8b and 10b of Fig. 5. However, in Fig. 6, a single shading coil 17c is employed instead of the two shading coils of Fig. 5.

A further modification of my invention is illustrated in Fig. 7. The construction of Fig. 7 includes a potential pole 8d and an electromagnet 10d, which are similar to the potential pole 8b and the electromagnet 10b of Fig. 5 except that the cross piece 11 of Fig. 5 is replaced by an adjustable cross piece 11d which may be adjusted vertically by means of an adjusting screw 27. Instead of plain shading coils, however, the potential pole 8d is provided with an auxiliary winding 28 which is energized by inductive action from the winding 8' mounted on the potential pole 8d. This auxiliary winding is connected to two motoring windings 29 and 30 which are mounted on the extensions 23d, 24d and the portions 15d and 16d of the potential pole. These motoring windings and the voltage winding 8' are designed to produce magnetic fluxes differing in phase by approximately 90° to produce a shifting field for the armature 14d in a manner well known in the art.

By operating the adjustment screw 27 to raise or lower the cross piece 11d some adjustment of the speed of the armature 14d may be effected.

Although I have described my invention with reference to certain specific embodiments thereof, it is obvious that numerous modifications thereof are possible. Therefore, I do not wish my invention to be restricted except as required by the appended claims when interpreted in view of the prior art.

I claim as my invention:

1. In a measuring instrument having a measuring element and means including a voltage coil for actuating said measuring element in accordance with a function of the voltage and current in an alternating current electrical circuit; a rotatable, electro-conductive armature element positioned in the path of magnetic flux produced by said voltage coil, means for modifying said magnetic flux for producing a shifting magnetic field for said rotatable electro-conductive armature element, said modifying means including a shading coil for lagging a portion of said magnetic flux relative to another portion thereof, and means for directing said portions of magnetic flux respectively through separate portions of said armature element, temperature responsive means for varying the effective inductance of said shading coil for compensating said measuring instrument for variations in performance caused by temperature changes therein, a second rotatable electroconductive armature positioned in the path of magnetic flux produced by said voltage coil, means for associating with said last-named magnetic flux an additional magnetic flux for establishing a shifting magnetic field for said second armature, said last-named magnetic flux being responsive to the current in said circuit, and a maximum demand register having timing mechanism and measuring mechanism actuated respectively by said armatures.

2. In a measuring instrument having a measuring element and means including a voltage coil for actuating said measuring element in accordance with a function of the voltage and current in an alternating current electrical circuit; a rotatable, electro-conductive armature element positioned in the path of magnetic flux produced only by said voltage coil, means for modifying said magnetic flux for producing a shifting magnetic field for said rotatable electro-conductive armature element, said modifying means including a shading coil for lagging a portion of said magnetic flux relative to another portion thereof, and means for directing said portions of magnetic flux respectively through separate parts of said armature element, and temperature responsive means for varying the effective inductance of said shading coil for compensating said measuring instrument for variations in performance caused by temperature changes therein, said temperature responsive means comprising a magnetic element having a negative temperature coefficient of permeability positioned only between the paths of shaded and unshaded portions of said magnetic flux.

3. In a temperature compensated alternating current electrical device, a rotatable electro-conductive armature, and means for rotating said armature including a magnetic pole piece divided into two portions each having a separate pole face adjacent a separate part of said armature, a shading coil on one of said portions for lagging magnetic flux passing through said one portion to produce a shifting magnetic field for said armature, a magnetic element having a negative temperature coefficient of permeability positioned substantially entirely between the ends of said portions for compensating said device for variations in temperature thereof, and means directing through said portions of said pole piece substantially all of the magnetic flux acting on said armature.

4. In an alternating current electrical instrument, a pair of spaced electroconductive armatures, means mounting said armatures for independent rotation about parallel axes, a columnar magnetic pole member positioned substantially between said armatures substantially parallel to said axes and having at one end a first pole face adjacent a first one of said armatures, said magnetic pole member having at its opposite end a second pole face adjacent a second one of said armatures, potential responsive means positioned substantially between said armatures and effective when energized for producing a first alternating magnetic flux in said pole member, means associated with said first pole face for converting magnetic flux derived only from said first alternating magnetic flux into a shifting magnetic field for rotating said first armature at a substantially constant rate of rotation, means for producing a second alternating magnetic flux, and means for associating said first and second magnetic fluxes for producing a shifting magnetic field operating to rotate said second armature.

5. In an alternating current electrical instrument; an electromagnet having spaced first and second air gaps, said electromagnet comprising a potential pole member extending directly between said air gaps and having first and second pole faces bordering respectively said first and second air gaps, means positioned on said potential pole member between said pole faces for producing magnetic flux in said potential pole member in accordance with the potential of an alternating electrical circuit, current pole means bordering said first air gap, means for producing magnetic flux in said current pole means in accordance with current flowing in an alternating electrical circuit, said electromagnet being designed to associate said magnetic fluxes for providing a shifting magnetic field in said first air gap, and said electromagnet being designed to provide substantially symmetrical paths for magnetic flux passing through said potential pole member; and means comprising a short circuited winding for producing in said second air gap a shifting magnetic field energized only by magnetic flux passing through said potential pole member.

6. In an alternating current electrical instrument; an electromagnet having spaced first and second air gaps, said electromagnet comprising a columnar potential pole member extending directly between said air gaps and having first and second pole faces bordering respectively said first and second air gaps, said potential pole member being divided adjacent said second air gap into a plurality of pole portions, means positioned on said potential pole member between said pole faces for producing magnetic flux in said potential pole member in accordance with the potential of an alternating electrical circuit, current pole means bordering said first air gap, means for producing magnetic flux in said current pole means in accordance with current flowing in an alternating electrical circuit, said electromagnet being designed to associate said magnetic fluxes for providing a shifting magnetic field in said first air gap, and said electromagnet being designed to provide substantially symmetrical paths for magnetic flux passing through said potential pole member; means comprising a short circuited winding positioned around part only of said pole portions for producing in said second air gap a shifting magnetic field energized only by magnetic flux passing through said potential pole member, a pair of electroconductive discs, and means mounting each of said electroconductive discs for independent rotation in a separate one of said air gaps.

7. In an alternating current electrical instrument; an electromagnet having spaced first and second air gaps, said electromagnet comprising a columnar potential pole member extending directly between said air gaps and having at its ends first and second pole faces bordering respectively said first and second air gaps, said potential pole member being divided adjacent said second air gap into a plurality of pole portions, means positioned on said potential pole member between said pole faces for producing magnetic flux in said potential pole member in accordance with the potential of an alternating electrical circuit, current pole means bordering said first air gap, means for producing magnetic flux in said current pole means in accordance with current flowing in an alternating electrical circuit, said electromagnet being designed to associate said magnetic fluxes for providing a shifting magnetic field in said first air gap, and said electromagnet being designed to provide substantially symmetrical paths for magnetic flux passing through said potential pole member; means comprising a short circuited winding positioned around part only of said pole portions for producing in said second air gap a shifting magnetic field energized only by magnetic flux passing through said potential pole member, a pair of electroconductive discs, means mounting each of said electroconductive discs for independent rotation in a separate one of said air gaps, and a magnetic element having a negative temperature coefficient of permeability positioned between the ends of said pole portions for compensating said instrument for variations in temperature thereof.

THOMAS DANA BARNES.